(12) United States Patent
Delay et al.

(10) Patent No.: US 10,399,650 B2
(45) Date of Patent: Sep. 3, 2019

(54) SYSTEM FOR MONITORING MARINE VESSELS AND DETERMINING RENDEZVOUSES THEREBETWEEN AND RELATED METHODS

(71) Applicant: Harris Corporation, Melbourne, FL (US)

(72) Inventors: John L. Delay, Mason, OH (US); Mark A. Ingersoll, Thonotosassa, FL (US); Mark D. Rahmes, Melbourne, FL (US); David A. Mottarella, Palm Bay, FL (US); Eric P. Spellman, Viera, FL (US); Kevin L. Fox, Palm Bay, FL (US); John T. Farrell, Melbourne, FL (US)

(73) Assignee: HARRIS CORPORATION, Melbourne, FL (US)

( * ) Notice: Subject to any disclaimer, the term of this patent is extended or adjusted under 35 U.S.C. 154(b) by 192 days.

(21) Appl. No.: 15/407,658

(22) Filed: Jan. 17, 2017

(65) Prior Publication Data
US 2018/0201348 A1 Jul. 19, 2018

(51) Int. Cl.
*B63B 49/00* (2006.01)
*B64G 1/10* (2006.01)
(Continued)

(52) U.S. Cl.
CPC ............ *B63B 49/00* (2013.01); *B64G 1/1007* (2013.01); *G01S 19/45* (2013.01); *G05D 1/0206* (2013.01);
(Continued)

(58) Field of Classification Search
CPC ... B63B 49/00; B63B 2213/02; B64G 1/1007; G01S 19/45; G05D 1/0206; G06K 9/0063; G08G 3/00; G08G 3/02; H04B 7/1851
See application file for complete search history.

(56) References Cited

U.S. PATENT DOCUMENTS 4,941,193 A 7/1990 Barnsley et al.
5,065,447 A 11/1991 Barnsley et al.
(Continued)

FOREIGN PATENT DOCUMENTS

EP 2610636 7/2013
WO 2007143478 12/2007
(Continued)

OTHER PUBLICATIONS

"The benefits of a Marine VHF Antenna", GAM Electronics, Aug. 6, 2014 https://gamelectronicsinc.com/the-benefits-of-a-marine-vhf-antenna/ (Year: 2014).*
(Continued)

*Primary Examiner* — John Olszewski
*Assistant Examiner* — Thomas E Worden
(74) *Attorney, Agent, or Firm* — Allen, Dyer, Doppelt + Gilchrist, P.A.

(57) ABSTRACT

A system for monitoring marine vessels using a satellite network may include a plurality of satellite payloads to be carried by respective satellites. Each satellite payload may include a communications interface configured to communicate via the satellite network, a radio frequency (RF) transceiver configured to communicate with the plurality of marine vessels, and a controller cooperating with the communications interface and the RF transceiver. The controller may obtain automatic identification system (AIS) data including vessel position and call sign information via the
(Continued)

transceiver, and communicate the AIS system data via the communications interface. The system may further include a terrestrial station configured to receive the AIS system data and determine therefrom a rendezvous between marine vessels which pass within a threshold distance for greater than a threshold time.

16 Claims, 14 Drawing Sheets

(51) Int. Cl.
| | |
|---|---|
| G01S 19/45 | (2010.01) |
| G05D 1/02 | (2006.01) |
| G06K 9/00 | (2006.01) |
| G08G 3/00 | (2006.01) |
| G08G 3/02 | (2006.01) |
| H04B 7/185 | (2006.01) |

(52) U.S. Cl.
CPC ............ *G06K 9/0063* (2013.01); *G08G 3/00* (2013.01); *G08G 3/02* (2013.01); *H04B 7/1851* (2013.01); *B63B 2213/02* (2013.01)

(56) References Cited

U.S. PATENT DOCUMENTS

| | | | |
|---|---|---|---|
| 5,384,867 A | 1/1995 | Barnsley et al. | |
| 5,416,856 A | 5/1995 | Jacobs et al. | |
| 5,430,812 A | 7/1995 | Barnsley et al. | |
| 5,793,813 A * | 8/1998 | Cleave | H04B 7/18567 342/352 |
| 5,978,653 A * | 11/1999 | Taylor | H04B 7/195 455/13.1 |
| 7,259,714 B1 * | 8/2007 | Cataldo | G01S 13/22 342/104 |
| 7,349,361 B1 | 3/2008 | Allaway et al. | |
| 7,391,907 B1 * | 6/2008 | Venetianer | G06K 9/00771 382/103 |
| 8,170,272 B1 | 5/2012 | Joslin et al. | |
| 8,411,969 B1 * | 4/2013 | Joslin | G06K 9/0063 382/103 |
| 8,779,920 B2 | 7/2014 | Garnier et al. | |
| 8,787,638 B2 | 7/2014 | Zee et al. | |
| 8,904,257 B2 | 12/2014 | Randhawa et al. | |
| 9,094,048 B2 | 7/2015 | Randhawa et al. | |
| 9,331,774 B2 | 5/2016 | Chen et al. | |
| 10,055,648 B1 * | 8/2018 | Grigsby | G06K 9/00771 |
| 2002/0019229 A1 | 2/2002 | Usher et al. | |
| 2002/0169527 A1 * | 11/2002 | Cline | G06Q 10/08 701/21 |
| 2004/0027451 A1 | 2/2004 | Baker | |
| 2005/0090978 A1 | 4/2005 | Bathory et al. | |
| 2005/0100208 A1 | 5/2005 | Suzuki et al. | |
| 2006/0244826 A1 | 11/2006 | Chew | |
| 2008/0079608 A1 * | 4/2008 | Morrell | G08G 3/00 340/984 |
| 2009/0161797 A1 | 6/2009 | Cowles et al. | |
| 2009/0207020 A1 | 8/2009 | Garnier et al. | |
| 2011/0025580 A1 | 2/2011 | Gray et al. | |
| 2011/0113148 A1 * | 5/2011 | Salmela | G01C 21/3438 709/229 |
| 2011/0187860 A1 | 8/2011 | Antikidis et al. | |
| 2013/0156439 A1 * | 6/2013 | Arnold | H04B 10/118 398/125 |
| 2013/0159924 A1 | 6/2013 | Yates et al. | |
| 2014/0152017 A1 * | 6/2014 | Bhusri | F03D 13/25 290/55 |
| 2014/0180566 A1 * | 6/2014 | Malhotra | G08G 3/02 701/300 |
| 2014/0267736 A1 * | 9/2014 | DeLean | G08B 13/19613 348/152 |
| 2014/0278062 A1 * | 9/2014 | Han | G08G 5/045 701/423 |
| 2015/0088479 A1 | 3/2015 | Rahmes et al. | |
| 2015/0119081 A1 | 4/2015 | Ayoob et al. | |
| 2015/0278734 A1 * | 10/2015 | Grant | G06Q 10/06313 705/7.23 |
| 2017/0094489 A1 * | 3/2017 | Petkus | H04W 4/90 |
| 2017/0102466 A1 * | 4/2017 | Petkus | G01S 19/46 |
| 2017/0261608 A1 * | 9/2017 | Nomura | G01S 7/22 |
| 2017/0309189 A1 * | 10/2017 | Shedley | G08G 3/02 |
| 2017/0309190 A1 * | 10/2017 | Suzuki | G08G 3/02 |
| 2018/0060808 A1 * | 3/2018 | Borgerson | G06F 17/30994 |
| 2018/0205444 A1 | 7/2018 | Delay et al. | |

FOREIGN PATENT DOCUMENTS

| | | |
|---|---|---|
| WO | 2011027037 | 3/2011 |
| WO | 2011138744 | 11/2011 |
| WO | 2015122842 | 8/2015 |
| WO | 2015127540 | 9/2015 |

OTHER PUBLICATIONS

Rahmes et al. "A Fast Fractal Method for 3D Point Data Compression and Void Filling" International LiDAR Mapping Forum (ILMF), 2013; pp. 8.

Rahmes et al. "The Beauty of Fractals New Technologies Converge to Aid 3-D Point-Data Processing" http://webcache.googleusercontent. com/search?q=cache:MkxllxSTxf0J:read.dmtmag.com/i/130499-geoworld-may-2013/3+&cd=1&hl=en&ct=clnk&gl=us; pp. 5.

http://www.exactearth.com/PRODUCTS/EXACTEARTH-SHIPVIEW: retrieved from internet Dec. 29, 2016; pp. 4.

Peter De Selding "Harris, exactEarth to Place AIS Gear on Iridium Craft" hftp://spacenews.com/harris-exactearth-to-place-ais-gear-on-iridium-craft/ Jun. 9, 2015;pp. 4.

Ristic et al. "Statistical Analysis of Motion Patterns in AIS data: anomaly detection and motion prediction" 2008, Proceedings of the 11th International Conference on Information Fusion, Fusion 2008. pp. 7.

Liu et al. "Ship movement anomaly detection using specialized distance measures" 2015 18th International Conference on Information Fusion, Fusion 2015, p. 1113-1120.

Zhou et al. "A Streaming Framework for Seamless Building Reconstruction from Large-Scale Aerial LiDAR Data" pp. 8.

Paul J. Metzger "Automated indications and warnings from live surveillance data" Lincoln Laboratory Journal; vol. 18, No. 1, 2009; pp. 66-78.

Kowalska et al. "Maritime Anomaly Detection using Gaussian process active learning" kirakowalska.com/publications/FUSION12-P-0304_FinalPDF.pdf pp. 1164-1171.

"Multiple Image Information Extraction" 37th AIPR Workshop; Oct. 15-17, 2008, pp. 37.

Martineau et al. "Maritime anomaly detection; domain introduction and review of selected literature" www.dtic.mil/dtic/tr/fulltext/u2/a554310.pdf pp. 66.

Neil C. Rowe "Detecting suspicious behavior from only positional data with distributed sensor networks" faculty.nps.edu/ncrowe/DETC2005-04420.htm; Proceedings of DTEC '05; 2005 ASME international Design Engineering Technical Conferences and Computers and information in Engineering Conference. DETC 2005-84420; pp. 8.

Wallace et al. "Identifying structural trend with fractal dimension and topography," Geology: 2006; v. 34. No. II. pp. 901-904. Abstract Only.

Bath et al. "Detection systems information fusion" Johns Hopkins APL Technical Digest, vol. 26, No. 4. (2005) pp. 9.

Automatic Target Recognition XXVII; SPIE Apr. 19, 2016: https://spie.org/SID/conferencedetails/automatic-target- recognition pp. 4.

"DOLPHIN Report Summary Final Report Summary—DOLPHIN (Development of Pre-operational Services for Highly Innovative Maritime Surveillance Capabilities)" cordis.europa.eu/result/rcn/159422_en.html: CORDIS Apr. 1, 2015; pp. 8.

The Coast Guard Journal of Safety& Security at Sea Proceedings of the Marine Safety & Security Council "Maritime Domain Awareness" Fall 2006; pp. 96.

(56) References Cited

OTHER PUBLICATIONS

"Welcome to DARPA/TTO's proposers' day" www.darpa.mil; Apr. 29-30, 2015; pp. 83.
Herbin et al. "Scene understanding from aerospace sensors; what can be expected?" https://hal.archives-ouvertes.fr/hal-01183709/document: Journal AerospaceLab; issue 7, May 2012; pp. 15.
Deng et al. What does classifying more than 10,000 image categories tell us? Proceedings of the 12th European Conference of Computer Vision (ECCV). 2010. pp. 14.
Russakovsky et al. "Attribute Learning in Large-scale Datasets" Proceedings of the 12th European Conference of Computer Vision (ECCV), 1st International Workshop on Parts and Attributes. 2010. pp. 14.
ImageNet: Constructing a Large-Scale Hierarchical Image Database. Journal of Vision: Aug. 2009, vol. 9, 1037: pp. 2.
Fei-Fei et al. 'Construction and Analysis of a Large Scale Image Ontology': Vision Sciences Society (VSS), 2009. p. 1.
International workshop on Maritime Anomaly Detection MAD 2011 Workshop Proceedings. mad.uvt.nl/mad/mad2011-proceedings.pdf Jun. 17, 2011; pp. 46.
IGARS Program: capita.wustl.edu/capita/capitareports/060730IGARS . . . /print_program.pdf pp. 107.
IEEE International Geoscience and Remote Sensing Symposium: Jul. 23-27, 2007; congress.cimne.upc.es/igarss07/frontal/ProgTodo.asp pp. 106.
Gomez-Romero et al. "Context-based multi-level information fusion for harbor surveillance" decsai.ugr.es/~jgomez/doc/IF2015-preprint.pdf: Information Fusion (2014) pp. 32.
SPIE DSS "Geospatial Informatics, Fusion, and Motion Video Analytics V" Apr. 20-21, 2015 spie.org/DEF15/conferencedetails/geospatial-infofusion pp. 4.
Cenre for Stragegy *& Evaluation Services "Ex-post evaluation of PASR activities in the filed of security and interim evaluation of FP7 security research" ec.europa.eu/dgs/ . . . /security/ . . . /maritime_case_study_cses_en.pdf Jan. 2001; pp. 24.
Gomez-Romero et al. "A practical approach to the develpment of ontology-based information fusion systems" Applied Artificial Intelligence Group, University Carlos III of Madrid, Spain: e-archivo.uc3m.es/bitstream/handle/ . . . /practical_HSD_2013_ps.pdf. pp. 47.
Osekowska et al. "Grid size optimization for potential field based maritime anomaly detection" Transportation Research Procedia 3 (2014) pp. 720-729.
De Selding Harris, exactEarth aim to ride iridium next to growth in AIS: http://spacenews.com/harris-exactearth-aim-to-ride-iridium-next-to-growth-in-ais/ Jun. 15, 2015; pp. 4.
U.S. Appl. No. 15/407,410, filed Jan. 17, 2017.
U.S. Appl. No. 15/407,391, filed Jan. 17, 2017.
Marghany et al., Fractal dimension algorithm for detecting oil spills using RADARSAT-1 SAR, Department of Remote Sensing, Faculty of Geoinformation Science and Engineering, Universiti Teknologi, Malaysia, Aug. 2007, pp. 1054-1062.

* cited by examiner

| ENTRY NUMBER | SHIP POSITION | SHIP LENGTH | FRACTAL DIMENSION | SHIP CLASS |
| --- | --- | --- | --- | --- |
| 1 | 9.8888N_115.5354E | 157.3603 | 23609 | 1 |
| 2 | 9.893N_115.5322E | 167.5977 | 18366 | 1 |
| 3 | 9.8953N_115.5522E | 52.9457 | 1389 | 3 |
| 4 | 9.9067N_115.5445E | 162.7652 | 18211 | 1 |
| 5 | 9.904N_115.5399E | 175.463 | 8937 | 1 |
| 6 | 9.9092N_115.5378E | 31.3409 | 858 | 3 |
| 7 | 9.9069N_115.5337E | 169.7181 | 26796 | 1 |
| 8 | 9.9276N_115.5216E | 293.1024 | 192593 | 2 |
| 9 | 9.8964N_115.5178E | 55.5428 | 66 | 3 |
| 10 | 9.9065N_115.5132E | 82.5984 | 4258 | 4 |
| 11 | 9.9129N_115.5106E | 63.5315 | 1271 | 3 |
| 12 | 9.9131N_115.5082E | 110.9471 | 17090 | 4 |
| 13 | 9.9059N_115.5014E | 290.5237 | 209126 | 2 |
| 14 | 9.913N_115.5036E | 299.2662 | 198515 | 2 |
| 15 | 9.9181N_115.5057E | 298.9916 | 156998 | 2 |

FIG. 11

SYSTEM FOR MONITORING MARINE VESSELS AND DETERMINING RENDEZVOUSES THEREBETWEEN AND RELATED METHODS

TECHNICAL FIELD

The present disclosure relates to marine vessel tracking systems, and more particularly to systems for monitoring marine vessels that send Automatic Identification System (AIS) signals and related methods.

BACKGROUND

The Automatic Identification System (AIS) is a tracking system for identifying and locating marine vessels by electronically exchanging data with other nearby vessels, AIS base stations, and satellites. AIS information may be used in conjunction with marine radar to help avoid collision with other vessels. AIS transmissions include information such as vessel identifiers, position, course, and speed. AIS not only allows oncoming vessels to know each other's locations, but it also allows maritime authorities to track and monitor vessel movements as well. AIS devices utilize information from satellite positioning systems (e.g., GPS), as well as other electronic navigation sensors, and communicate the AIS data via a very high frequency (VHF) transceiver.

U.S. Pat. Pub. No. 2009/0161797 to Cowles et al. discloses a system for detecting and decoding Automatic Identification System (AIS) signals which includes a plurality of orbital satellites. Each orbital satellite has at least one antenna with at least one antenna polarization for receiving a radio frequency signal. Each orbital satellite also has a communication module for accepting the radio frequency signal, converting the radio frequency signal into sampled packetized data for insertion into a raw data stream, inserting a plurality of signal parameters into the raw data stream, and transmitting the raw data stream and a telemetry data stream to at least one ground station. A processor located at the ground station receives and processes the raw data stream to identify one or more candidate AIS message signals.

Despite the existence of such systems, further advancements in marine vessel monitoring may be desirable in certain applications.

SUMMARY

A system for monitoring a plurality of marine vessels using a satellite network may include a plurality of satellite payloads to be carried by respective satellites. Each satellite payload may include a communications interface configured to communicate via the satellite network, a radio frequency (RF) transceiver configured to communicate with the plurality of marine vessels, and a controller cooperating with the communications interface and the RF transceiver. The controller may obtain automatic identification system (AIS) data including vessel position and call sign information via the transceiver, and communicate the AIS system data via the communications interface. The system may further include a terrestrial station configured to receive the AIS system data and determine therefrom a rendezvous between marine vessels which pass within a threshold distance for greater than a threshold time.

More specifically, the terrestrial station may include a processor and a memory coupled thereto configured to send at least one alert based upon a rendezvous determination. The system may further include at least one source for aerial marine imagery, and the terrestrial station may receive the aerial marine imagery from the at least one source. Moreover, the terrestrial station may include a memory and processor coupled thereto configured to combine aerial marine imagery and AIS data. Furthermore, the terrestrial station may be configured to determine rendezvous further based upon the aerial marine imagery. Also, the terrestrial station may be configured to determine whether an actual course for a given marine vessel deviates from a reported course based upon the AIS data and the aerial marine imagery.

In accordance with another example aspect, the terrestrial station may be configured to determine a gap in at least one of reported vessel course data and vessel heading data based upon the AIS data. By way of example, the RF transceiver may comprise a VHF transceiver.

A related terrestrial station, such as the one described briefly above, and a related marine vessel monitoring method are also provided. The method may include receiving, at a terrestrial station, respective AIS data including vessel position and call sign information for a plurality of marine vessels from a plurality of satellites receiving the AIS data from the marine vessels, and determining from the AIS data a rendezvous between marine vessels which pass within a threshold distance for greater than a threshold time at the terrestrial station.

BRIEF DESCRIPTION OF THE DRAWINGS

FIG. 11 is a table of ship classifications determined by the system of FIG. 6 in accordance with an example embodiment.

DETAILED DESCRIPTION OF THE EMBODIMENTS

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout, and prime and multiple prime notation are used to indicate similarly elements in different embodiments.

Figure 1:
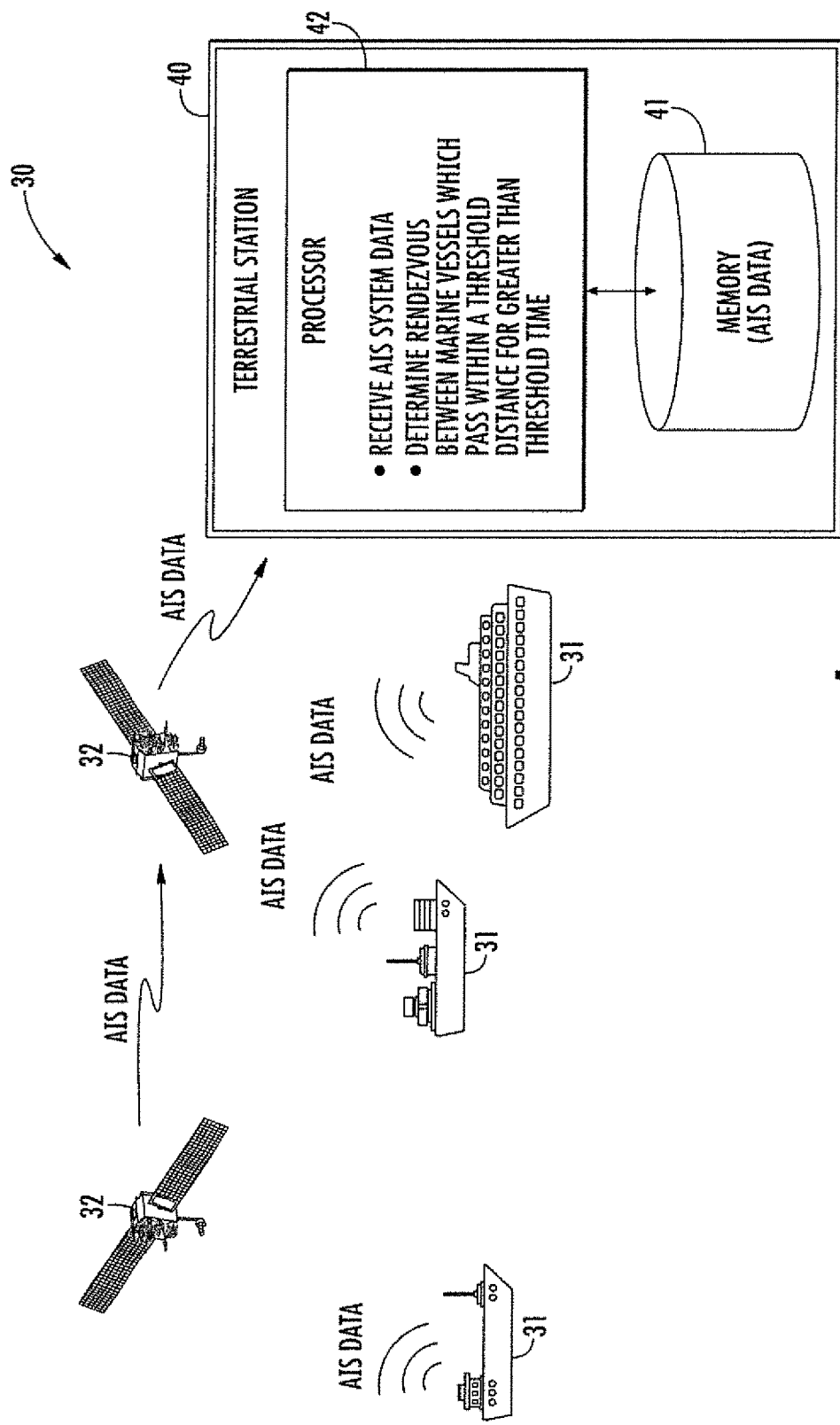
FIG. 1 is a schematic block diagram of a marine vessel monitoring system in accordance with an example embodiment providing vessel rendezvous detection.
Figure 2:
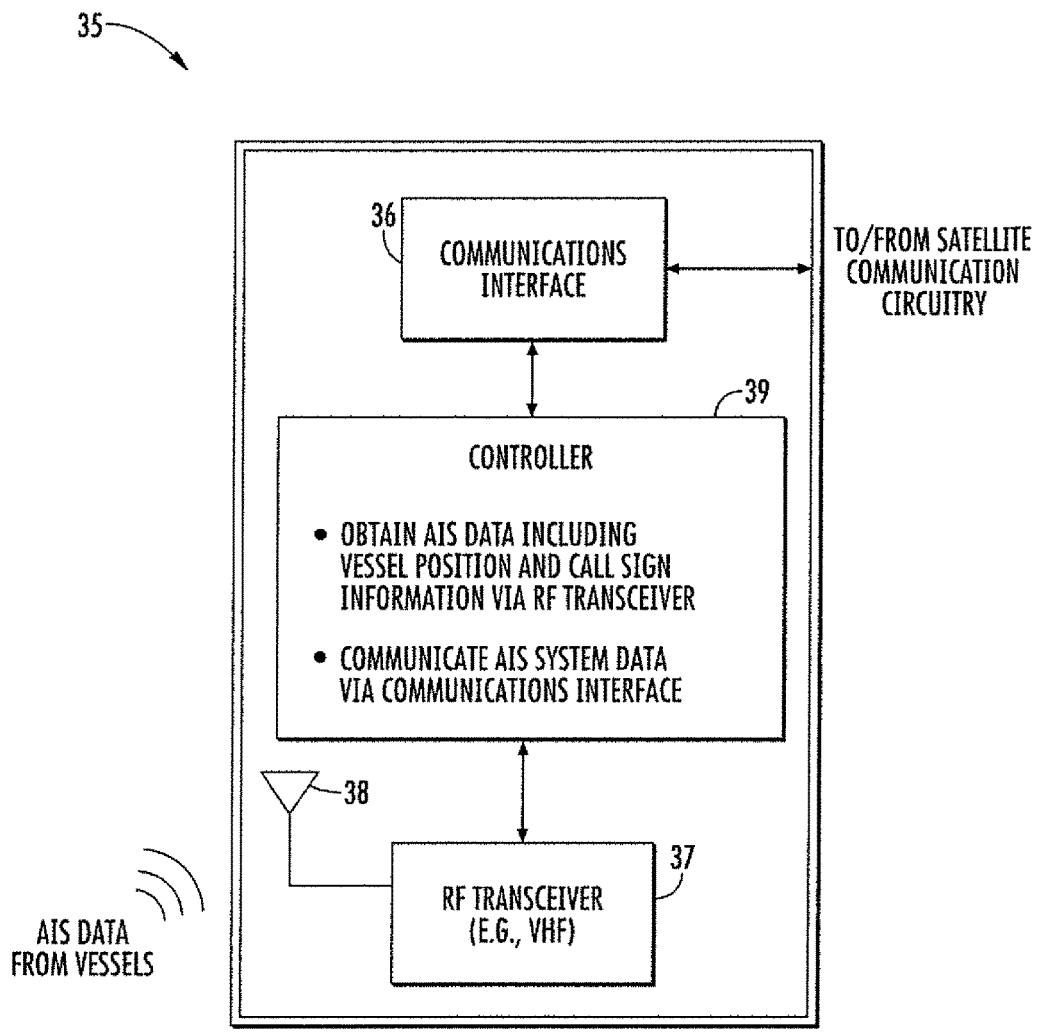
FIG. 2 is a schematic block diagram of an example satellite payload for use with the system of FIG. 1.

Referring initially to FIGS. 1-2, a system 30 for monitoring a plurality of marine vessels 31 using a network of satellites 32 is first described. By way of background, there are many thousands of commercial ships or vessels moving around the world's oceans on any given day. It may be important for not only governments but also private entities to monitor marine vessel movements for a variety of reasons including geopolitical concerns, emerging threats, cargo theft, etc. As described above, the vessels 31 may transmit AIS data which may not only be received by nearby vessels, but also by the low-earth orbit satellites 32. By way of example, the satellites 32 may be part of the Iridium satellite constellation, although other types of satellites may be used in different embodiments.

As seen in FIG. 2, each of the satellites 32 may be equipped with a respective payload 35 which illustratively includes a communications interface 36 configured to communicate via the satellite network (e.g., via microwave communications), a radio frequency (RF) transceiver 37 and associated antenna 38 configured to communicate with the plurality of marine vessels 31 to receive the AIS data therefrom, and a controller 39 cooperating with the communications interface and the RF transceiver. The controller 39 may obtain automatic identification system (AIS) data including vessel position and call sign information via the transceiver 37, and communicate the AIS system data via the communications interface 36 through the satellite constellation to a terrestrial station 40. As noted above, the satellite constellation may be the Iridium mobile communications satellite network, and the payloads 35 may be attached to respective Iridium satellites. That is, the communications interface 36 may utilize the existing Iridium inter-satellite communications infrastructure used for communicating mobile device communications to also communicate the AIS data. However, other types of communications satellites or constellations may be used in different embodiments.

In addition to providing enhanced coverage for AIS monitoring while the marine vessels 31 are at sea where their VHF communications cannot be picked up by terrestrial AIS antennas, the system 30 also advantageously provides for persistent surveillance capabilities resulting from the continuous and near real-time AIS data that is available throughout the voyage of a given marine vessel. One particularly advantageous surveillance capability is to determine an unexpected rendezvous between marine vessels 31 when they are in remote areas away from port, which is now further described with reference to the flow diagram 300 of FIG. 3.

Beginning at Block 301, the AIS data is received or intercepted by the RF transceivers 37 at respective satellites 32 as the vessels 31 come within range, at Block 302. As also described above, this data is communicated to the terrestrial station 40 via the satellite constellation, at Block 303, which may then be processed by the terrestrial station as part of a persistent surveillance program, for example. In the illustrated example, the terrestrial station 40 optionally receives aerial marine imagery data from an imagery source to assist with the rendezvous analysis, at Block 304, as will be discussed further below, although imagery data need not be used in all embodiments.

In the example in FIG. 1, the terrestrial station 40 illustratively includes a memory 41 to receive the AIS data provided from the satellite payloads 35, and a processor 42 (e.g., a microprocessor(s)) cooperating with the memory 41 to analyze the received AIS data. The processor 42 may be incorporated in a single computing device (e.g., server), or distributed over many such devices (e.g., a cloud computing configuration). That is, while all of the components of the processor 42 may be located at the same terrestrial station 40, in some embodiments the computational operations may be distributed among a plurality of computing devices which are at different geographical locations and connected by the Internet or other communications network, for example. In accordance with one example implementation, a Spark computing platform may be used to intelligently distribute computation among different processors, although other suitable computing platforms may also be used in different embodiments. Distributed computation may advantageously scale to allow for computation of billions of vessel location records, and in some embodiments anomalies like a rendezvous event may be pre-computed and stored for quick access, if desired. Indeed, the system 30 may be used to collect and process tens of millions of records from around the world each day. The terrestrial station 40 may be co-located with the satellite ground antennas in some embodiments, or they may be located remote from one another in other embodiments.

The processor 42 may be configured to determine from the AIS data (and optionally the aerial imagery data) a rendezvous between marine vessels 31 which pass within a threshold distance for greater than a threshold time. In accordance with one example, a rendezvous may be defined as ships coming within 200 m of one another, and more particularly 50 m, for a period of greater than 5 minutes, and more particularly greater than 10 minutes, although other threshold times and distances may be used in different embodiments.

In accordance with one example implementation, each rendezvous event may be captured and recorded in the memory 41 in the following format:

MMSI_1, MMSI_2, timeStart, timeFinish, approxLat, approxLon.

This event recordation may advantageously be used to efficiently query further AIS data as appropriate. Using the above-described example Spark processing configuration, example processing times for one day of collected global AIS data takes about 15 seconds to process for rendezvous events. Furthermore, Applicant theorizes, without wishing to be bound thereto, that a full two years of legacy data may be processed within a few hours using this computing platform.

When the processor 42 makes a rendezvous detection, at Block 305, an alert may be generated to the proper authorities, ship owner, etc. (Block 306), depending upon the scope of analysis and the particular vessels and their ports or origin. Generally speaking, an unscheduled rendezvous at sea may indicate that two vessels are engaging in an unauthorized exchange of cargo and trying to avoid detection of the exchange by authorities or the owners of the ships/cargo, as will be appreciated by those skilled in the art.

Figure 3:
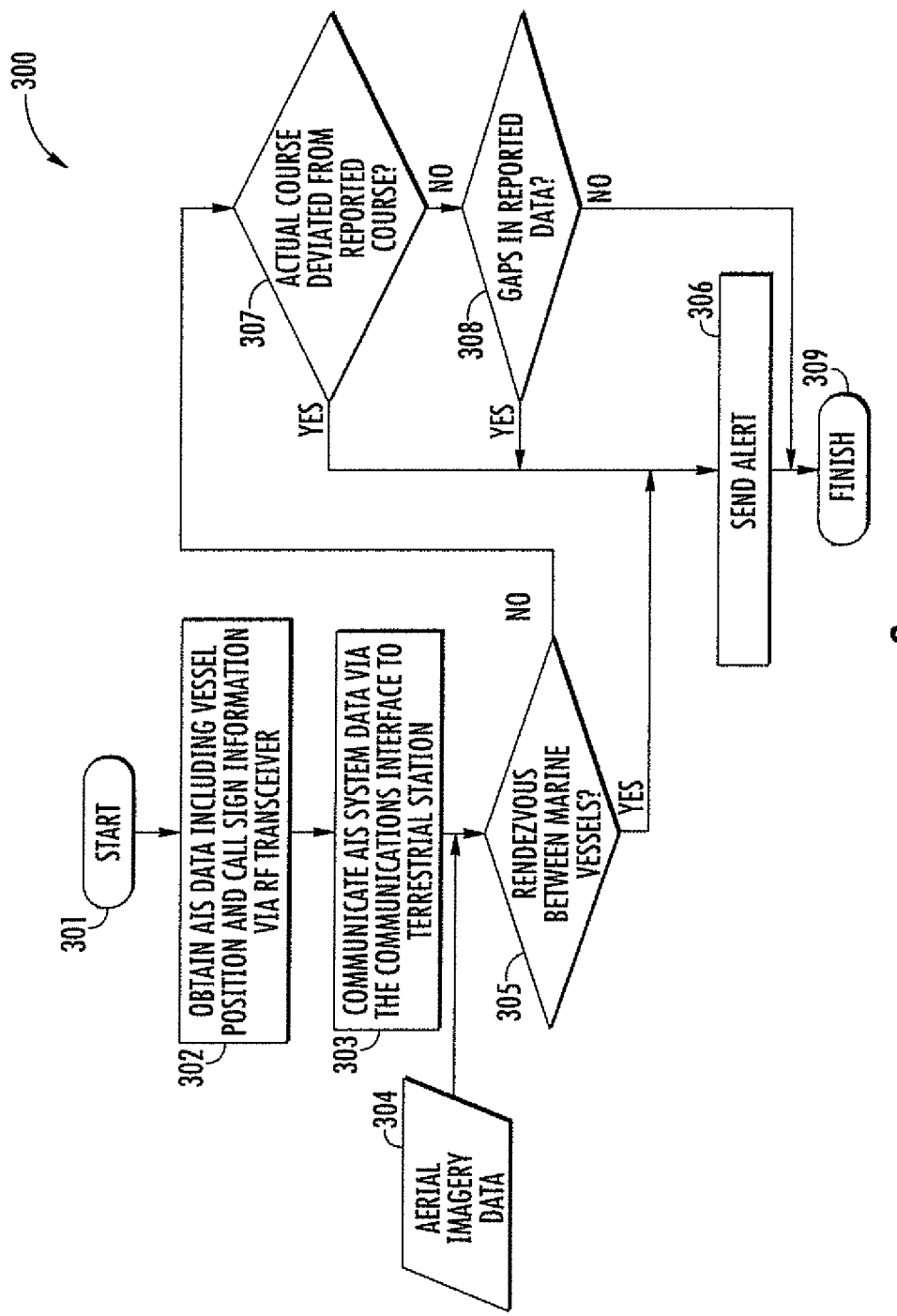
FIG. 3 is a flow diagram illustrating method aspects associated with the system of FIG. 1.

In addition to the detection of a ship-to-ship rendezvous in the open ocean, the processor 42 may further be used to detect other abnormalities or deviations in vessel "behavior" from the collected AIS data in certain embodiments. For example, the processor 42 may optionally determine deviations from a reported course or from established shipping lanes (or speed deviations), at Block 307, as well as to detect gaps in reported data, at Block 308, which may similarly result in an alert being generated. Other optional events which may be determined from the AIS analysis may include: when vessels turn off their AIS transmission and/or try to transmit "spoof" AIS data; when vessel "loitering" occurs; and identifying a vessel port of origin and predicting its destination based thereon and its reported course. With respect to deviation from a reported course or speed, this may also be determined based upon deviation greater than a threshold, such as more than 45 degrees off course or a speed deviation of more than 5 knots, for example, although other thresholds may also be used. The method of FIG. 3 illustratively concludes at Block 309.

Figure 4:
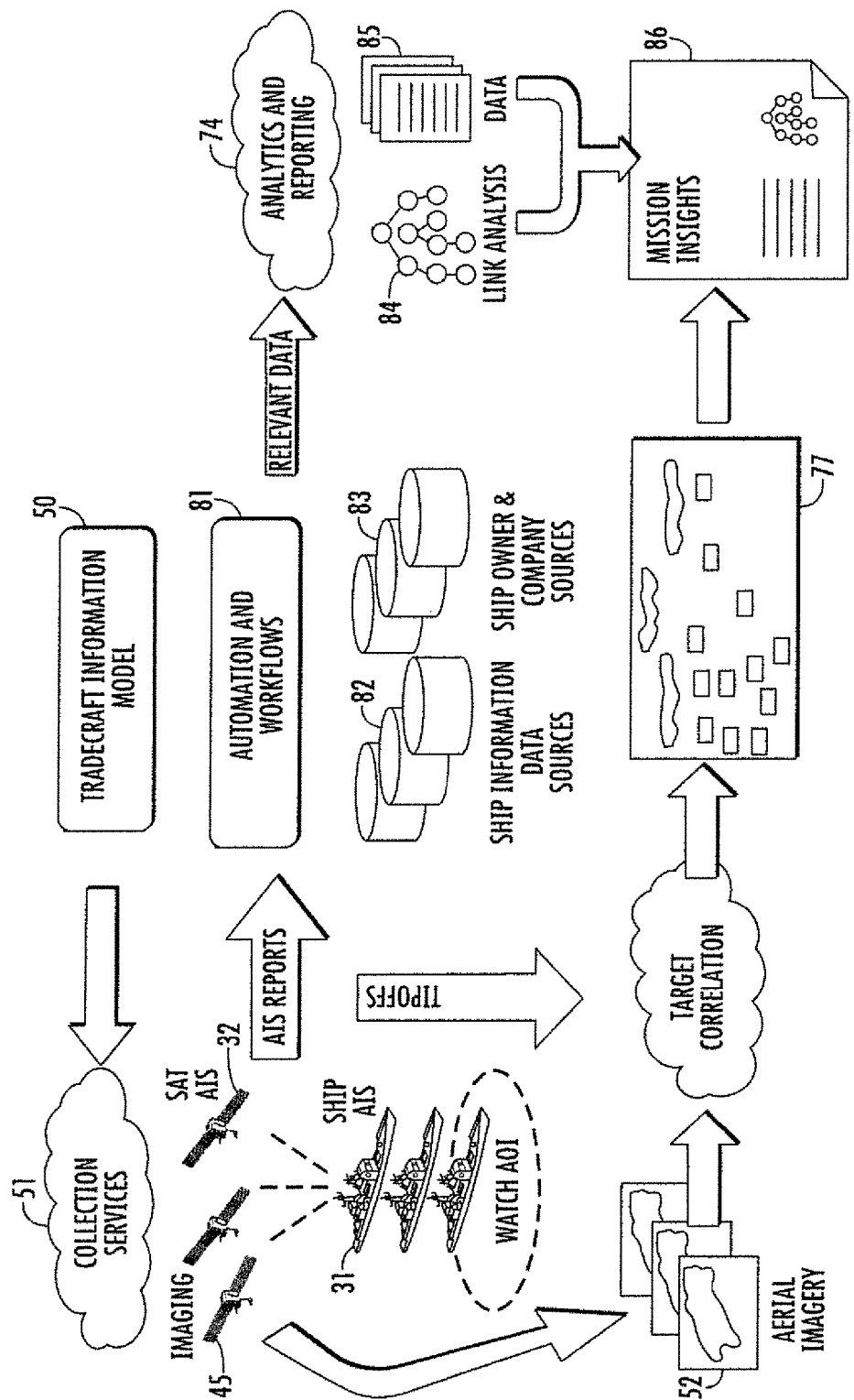
FIGS. 4 and 5 are schematic block diagrams illustrating an example implementation of the system of FIG. 1.
Figure 5:
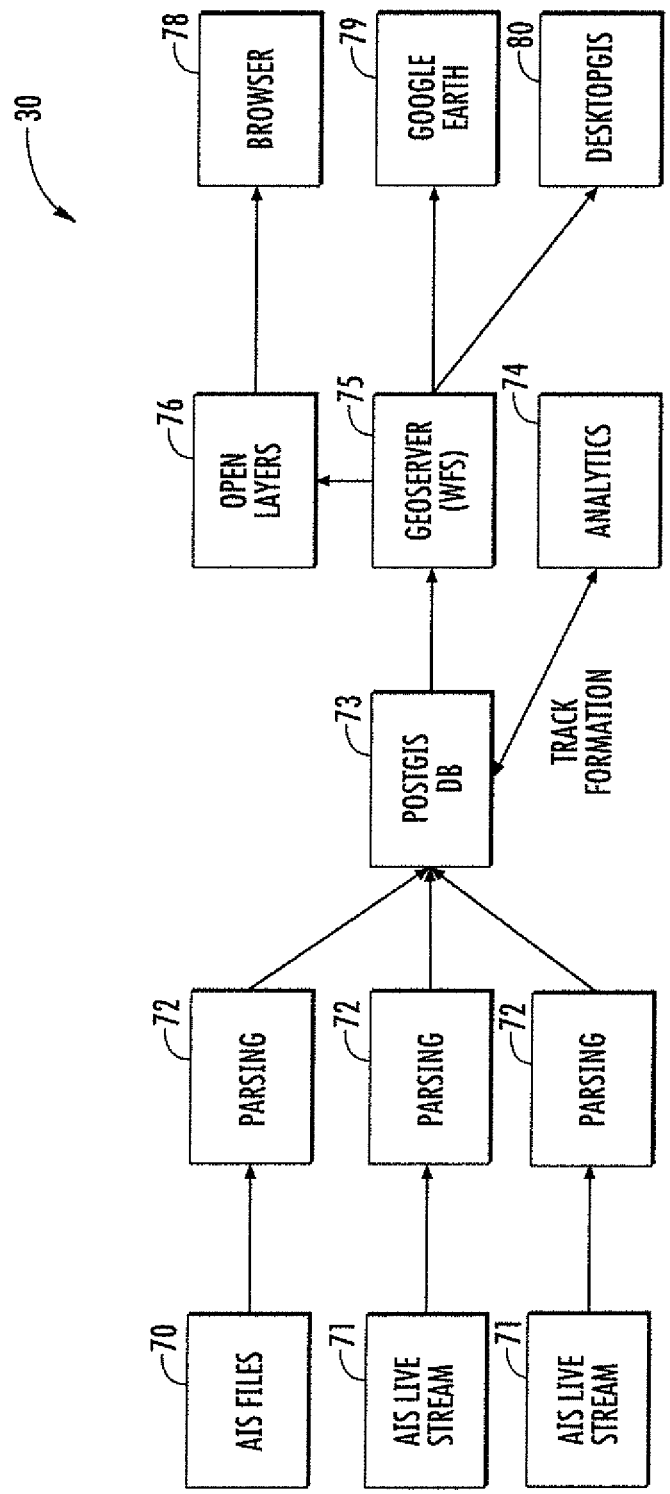
Figure 6:
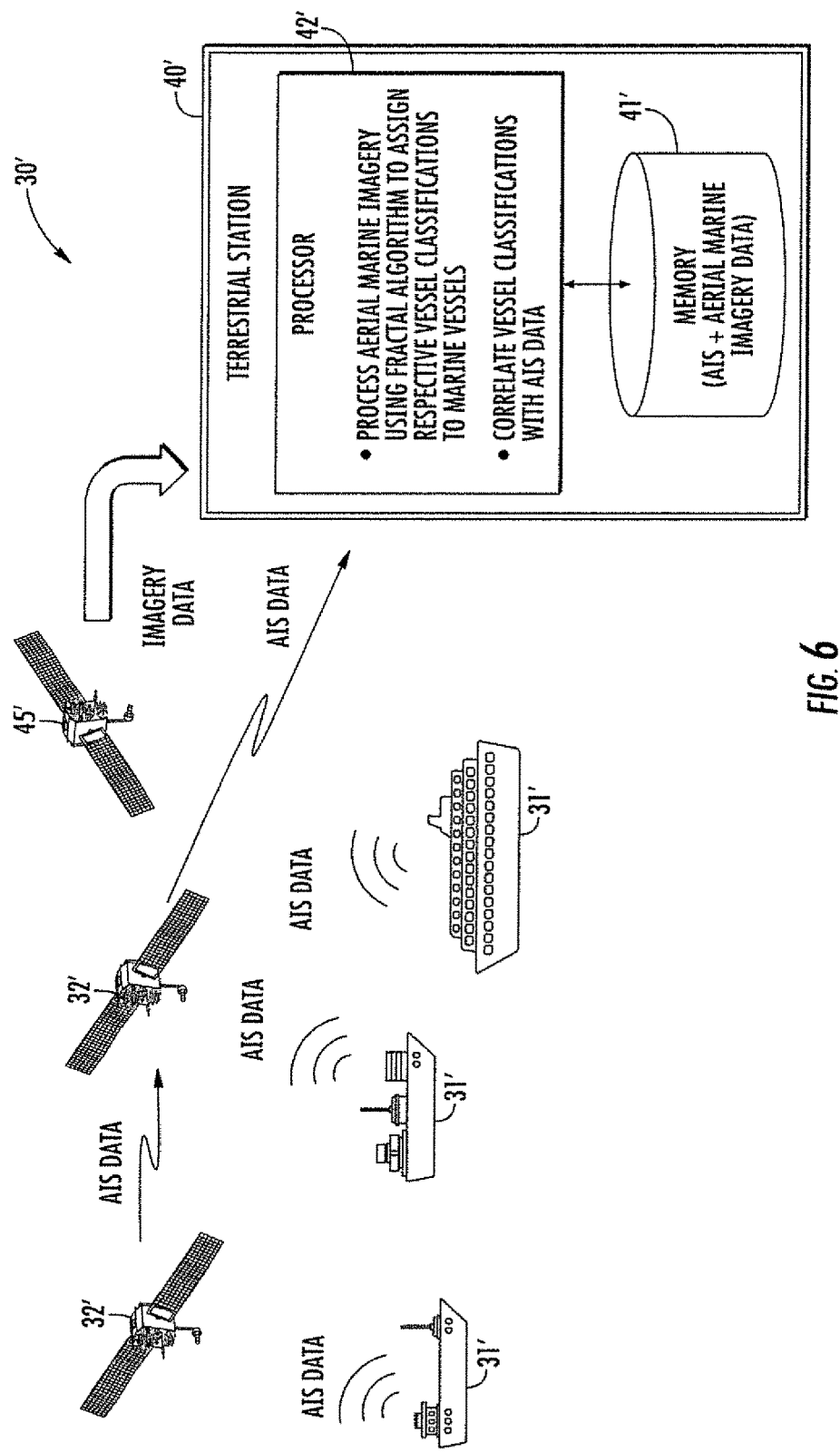
FIG. 6 is a schematic diagram of another marine vessel monitoring system in accordance with an example embodiment which utilizes fractal image processing to determine ship parameters.
Figure 7:
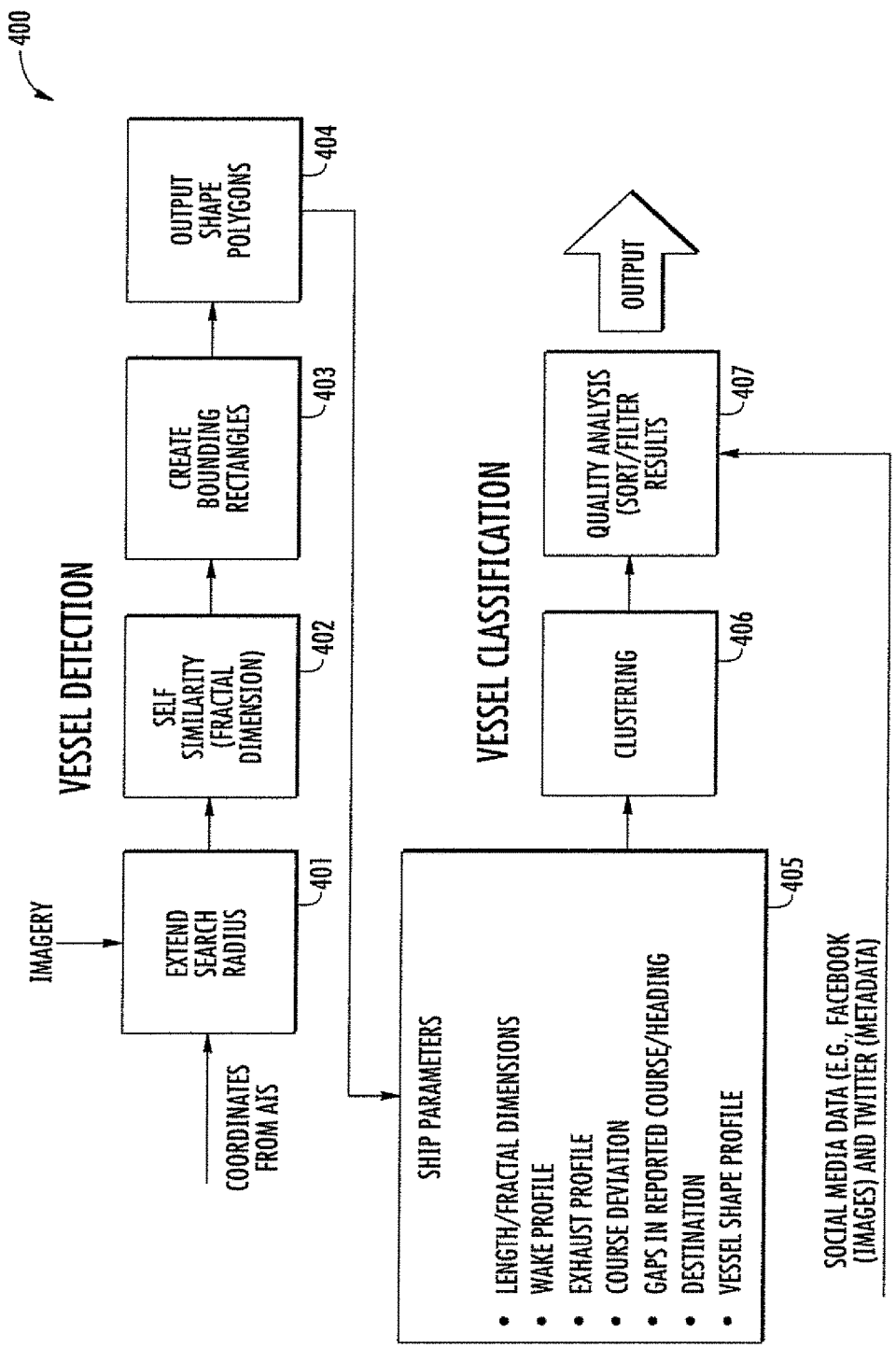
FIG. 7 is a flow diagram illustrating method aspects associated with the system of FIG. 6.

In accordance with one example implementation now described with respect to FIGS. 4-5, various tradecraft information models 50 may be provided to one or more collection services 51 which operate the constellation of satellites 32 and the imaging satellites 45 to generate AIS reports and aerial imagery 52 from AIS transmissions from the vessels 31, as noted above. The AIS data may take the form of both historical AIS data files 70 as well as one or more live AIS data streams 71. The AIS data may be parsed through various filters 72, and the results stored in a post geographic information system (GIS) database 73, for example, from which the above-described analytics may be performed by the processor 42 (Block 74). As part of the analytics, the processor 42 may correlate "tipoffs" from the AIS data along with the aerial imagery 52 to confirm changes in course, rendezvouses, etc., as will be discussed further below.

Graphical data outputs may be provided through a Geoserver Web Feature Service (WFS) as well as open layer to provide annotated aerial imagery 77 via browsers 78, geospatial image viewing programs such as Google Earth 79, and desktop GIS programs as well. Various automation and workflows 81 may draw further from ship information data sources 82 (e.g., customs data, etc.) and ship owner/corporate data sources 83 (e.g., passenger manifests, vessel identification information, etc.) to be used for the analytics and reporting 74, which may take the form of link analysis data 85 as well as data reports 85 output to authorities or ship/cargo owners as mission insight reports 86, as will be appreciated by those skilled in the art.

The system 30 may advantageously provide automated surveillance and processing of collections to create value-added information from raw data to help reduce analytical workloads. That is, the processor 42 may advantageously help to reduce the amount of data flowing into an intelligence enterprise, process data at the edge of an enterprise closer to its source, and provide value-added information to analysts. As such, a "geolocate to discover" all sources of data approach is used to support an Activity Based Intelligence (ABI) analysis. Information models may drive collections and processing workflows, while data providers may host the processing services in some implementations. Furthermore, maritime monitoring is enhanced through the system 30 which advantageously allows for the combination technologies including geospatial, analytics, image processing, as well social media and biometrics, as will be discussed further below.

Efficiency of the spatial data analysis may advantageously be provided through the use of spatial data to automatically create all of the requisite views (vs. the user explicitly creating all views via pan/roam/zoom). This may advantageously condense and reduce sparsely distributed point, line, and area geometric feature data for rapid and cost effective visualization, such as through the reduction by optimal packing of raster data in presentation, and the reduction by automated random sampling of geometric data, for example. The system 30 may also help to reduce analyst pan/zoom through large amounts of imagery, and point, line, and area geometries may be automatically displayed (calculated using ground sample distance (GSD) and object size) at full resolution (or user specified resolution) in a customized presentation. This may allow for a review of more features at higher resolution in less time by analysists.

Other optional features of the system 30 may include ordered sets of presentation views for methodical (as opposed to ad-hoc) review, presentation view order may be prioritized based on spatial and feature data attribution, and presentation views may be filtered based on spatial and feature data attribution. More particularly, presentation views may simultaneously support multiple types of raster 2D/3D data, imagery, and sensors (e.g., IR, EO, SAR, X-Ray, MRI, LIDAR, DSMs, DTMs). Moreover, the system 30 may also support a wide variety of applications such as GIS, HLS/Intelligence/Monitoring, Video, Medical, etc.

Turning now to FIGS. 6-11, another example implementation of the system 30' is now described which provides for enhanced processing of marine imagery for intelligence gathering. With respect to aerial imagery of large sections of open ocean, sifting out the small amount of salient information from a large volume of irrelevant distractions may be challenging and time intensive to do manually, particularly as instances of action may only occur between extended periods of inactivity. Moreover, airborne surveillance may include significant distortion due to change in perspective of the moving sensor. Furthermore, detected motion generally exceeds display time, requiring intelligent selection of motion displayed. The system 30' advantageously helps address these technical challenges by providing for automated summarization through effective techniques to compress data into condensed clips of salient activity, which may be tailored to individual needs.

Furthermore, in a typical configuration remote sensing requires image analysts to have the capability of identifying regions of interest (ROIs) in the corresponding imagery. The automatic extraction of image areas that represent a feature of interest uses two specific steps: (1) accurately classifying the pixels that represent the region while minimizing misclassified pixels; and (2) a vectorization step that extracts a contiguous boundary along each classified region which, when paired with its geo-location, may be inserted in a feature database independent of the image. Updating databases frequently using high-resolution panchromatic and multispectral imagery is typically only feasible if the time and labor costs for extracting features are significantly reduced. The system 30' may accordingly provide flexible and extensible automated workflows for feature pixel labeling and material classification, in which the products of workflows may accordingly undergo an accelerated review and quality control process as needed.

To address the above-noted technical drawbacks, the terrestrial station 40' may advantageously be configured to receive the AIS data and aerial marine imagery as discussed above, process the aerial marine imagery using a fractal algorithm to assign respective vessel classifications to a plurality of marine vessels, and correlate the vessel classifications with AIS data. Referring to the flow diagram 400 of FIG. 7, the aerial marine imagery may be correlated with the coordinates of interest from the AIS data to define an extended search radius of interest for the marine imagery, at Block 401. In accordance with one example embodiment, the processor 42' may perform dead reckoning from the reported AIS coordinates to define the potential search radius within the aerial imagery data, as the aerial imagery data may be provided on a less frequent scale than the AIS data (e.g., on the order of hours as opposed to minutes).

Once the area of interest (i.e., the search radius) is defined, the processor 42' may advantageously perform a self-similarity analysis on the imagery data in the fractal dimension to automatically distinguish the vessels 31' from the surrounding water and classify them as such, at Block 402. Generally speaking, fractals are infinitely complex patterns that are self-similar, repeating patterns across different scales. Fractals may be exactly the same at every scale or may be nearly the same at different scales, such as those found in nature. Fractals can be used to compress real-world data by finding self-similar features and removing redundant ones. Fractal algorithms look for similar voxel (3-D pixel) patterns within data, which can have several z (height) dimension values for each x and y (rectangular voxel). A fractal algorithm uses pattern recognition to look for patterns within patterns at multiple resolutions to find the feature domain to compress the original data. Fractals are a fragmented geometric shape that can be split into parts, each of which is a reduced-size copy of the whole.

One example fractal analysis approach may examine mutual information as a measure of change or similarity within the fractal domain. More particularly, mutual information may be defined as:

$$I(X;Y)=H(X)+H(Y)-H(X,Y) \quad (1)$$

where I is mutual information, H is the individual entropy, and H(X,Y) is joint entropy. The vectors X and Y may correspond to histograms with bins for pre and post-fractal dimensions. Entropy is defined as:

$$H(p_i)=-\Sigma p_i \log(p_i) \quad (2)$$

where p is the probability vector, which may be assumed to be a uniform distribution.

With respect to a fractal analysis of marine imagery, the ocean will have relatively low fractal dimensions since it looks similar to itself, whereas a vessel 31' will have a contrasting higher fractal dimension. In visual terms, these differences may be represented as a fractal "heat map", several examples of which are shown in FIGS. 10(a)-10(f), in which an aerial image of a vessel(s) is shown on the left and the corresponding fractal heat map for the image is directly to its right. It will be seen that the ocean surrounding the ship appears as a "cooler" or neutral color in the heat maps, whereas the higher profile of the vessels results in a "hotter" or darker color in the heat maps, thereby delineating the boundaries between the vessels and the water so that the clusters of higher points having elongated shapes may be classified as vessels. As a result, since the fractal domain data still has position (i.e., latitude/longitude) data associated with it, the points of the vessel where the edges are located in combination with the position information associated with these points may be used to readily determine the dimensions (e.g., length and width) of the vessels.

In this regard, the processor 42' may advantageously create boundary shapes (e.g., rectangles) or "chips" around the vessels 31' in the aerial imagery once its location is determined in the fractal domain, at Block 403. For example, the chips may be generated as GeoTiff images with a center corresponding to the latitude/longitude center of the respective vessel 31', for example, although other formats may also be used. Moreover, the processor 42' may fit lines to the boundary points defining the vessels 31' in each heat map to define polygons outlining the ship, at Block 404, from which the length and width of the respective vessel may be readily determined (Block 405) by the processor.

Figure 8:
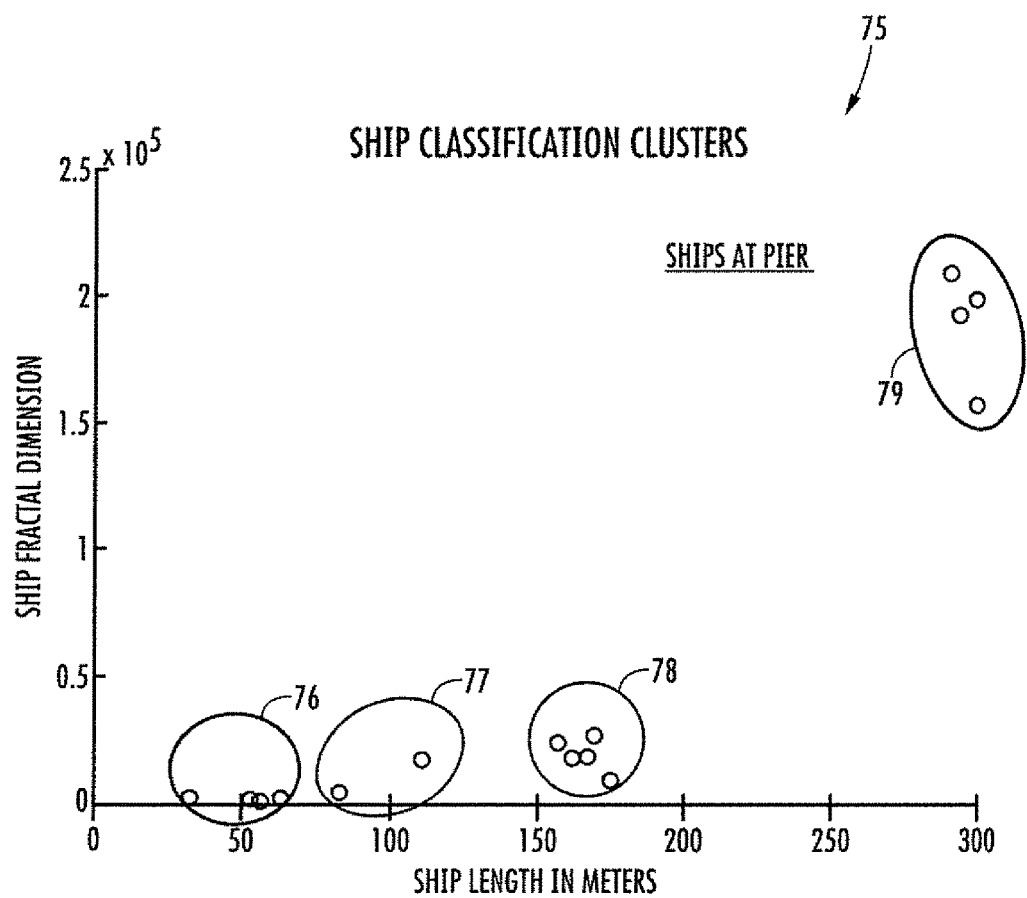
FIG. 8 is a graph illustrating results from an example implementation of the ship classification cluster step of the flow diagram of FIG. 7.
Figure 9:
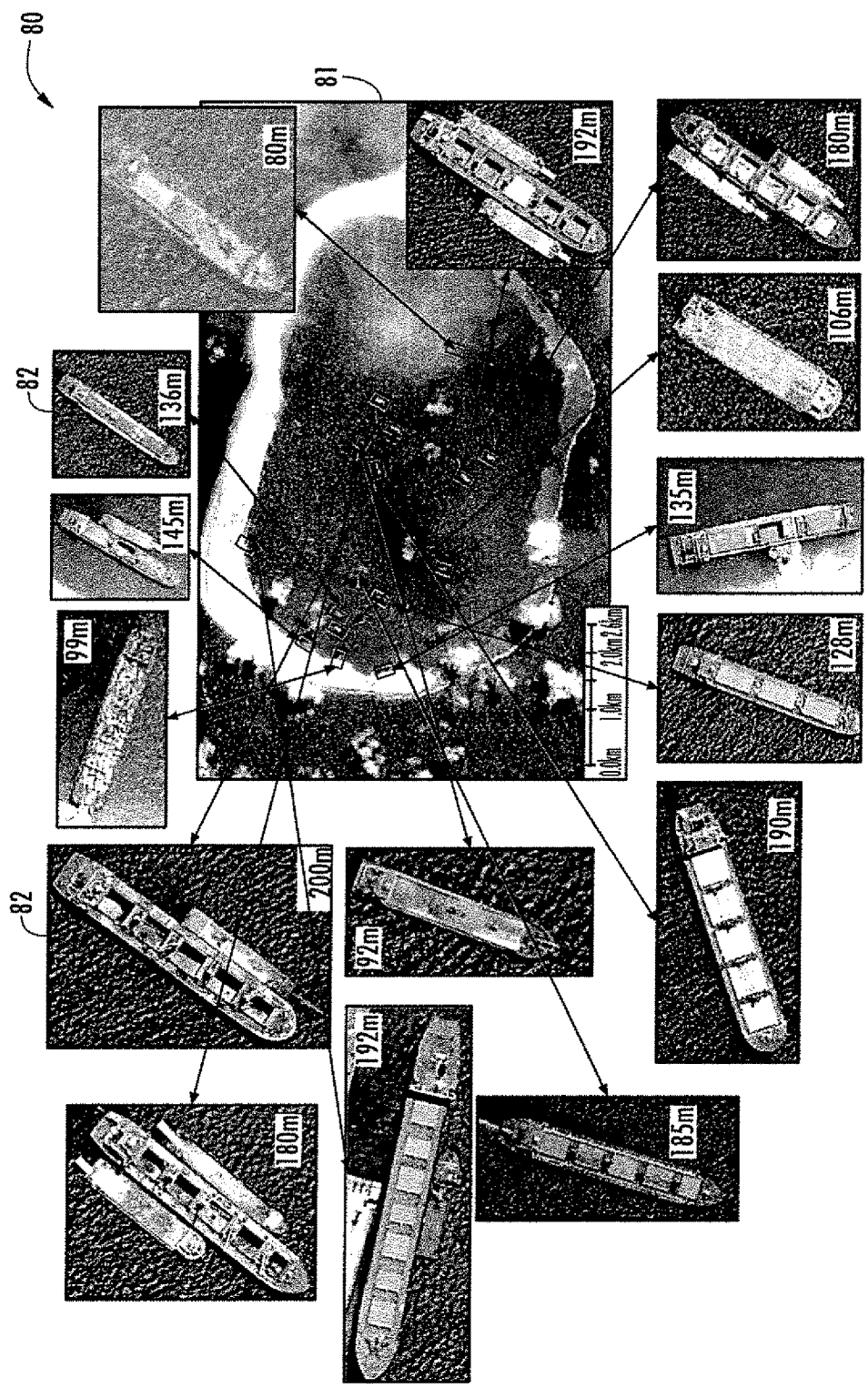
FIG. 9 is an aerial marine image including a plurality of marine vessels, which are also shown in exploded form, with associated vessel dimensions determined using the system of FIG. 6.
Figure 10:
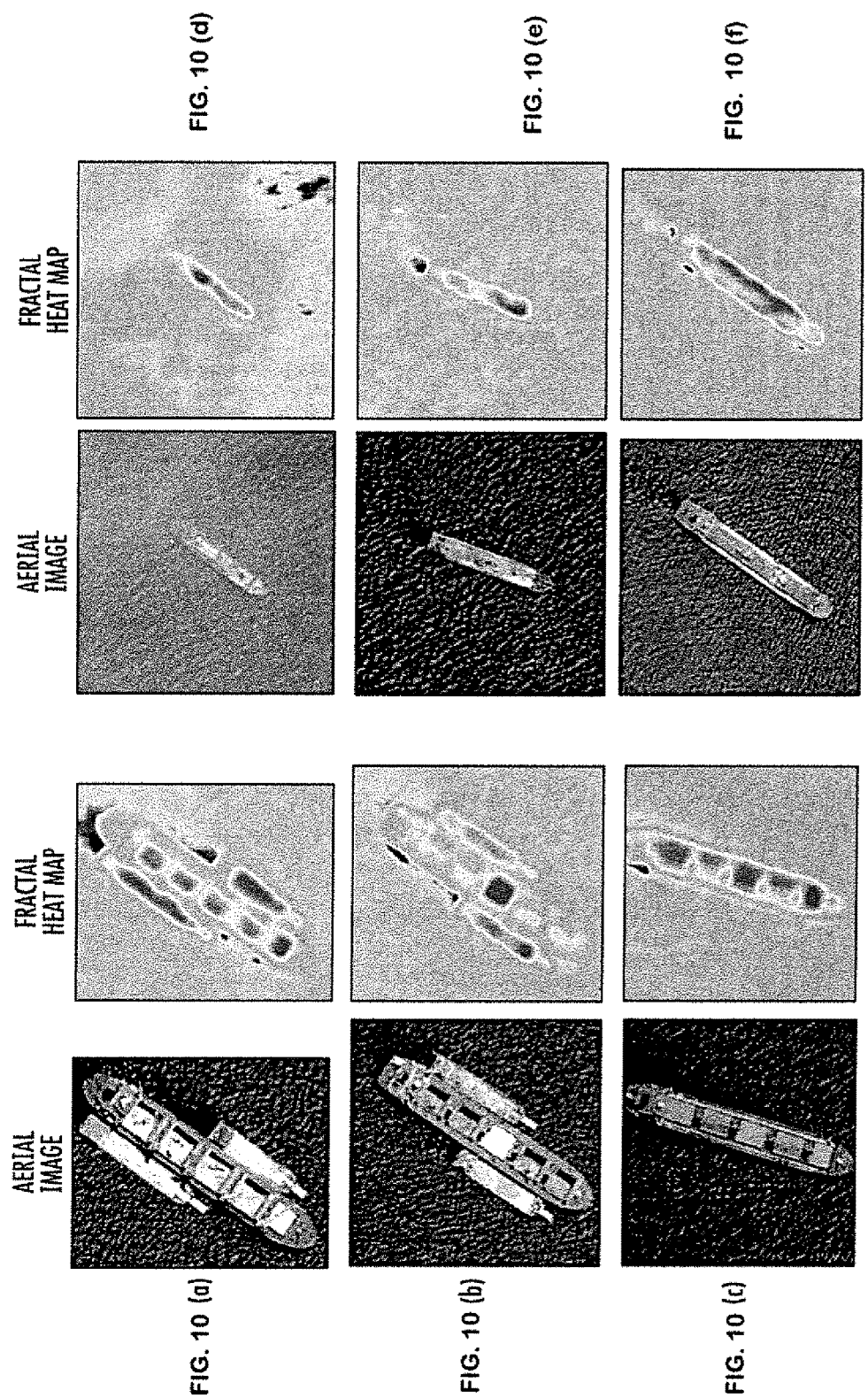
FIGS. 10(a)-10(f) are a series of side-by-side aerial image chips of marine vessels and their associated fractal heat maps generated by the system of FIG. 6.

The chips may then be used to more clearly illustrate the vessels, as seen in the simulated screen view 80 of FIG. 8. Here, a zoom out window 81 shows a plurality of vessels at port, along with corresponding zoom in windows 82 for respective chips where the image is zoomed in to reveal further details not evident in the zoom out window. Moreover, in the illustrated example further details regarding the vessels 31' determined from the fractal map, namely respective vessel length, is also displayed in each of the zoom in windows 82, although other dimensions (e.g., width or height) may also be provided in some embodiments.

The screen view 80 advantageously provides for an assisted target recognition (ATR) use case where automated processing may provide value-added information based upon an external source of data, which in this case is satellite AIS reports over a watch area during similar collection windows (e.g., satellite AIS, E/O imagery). All of the useful information within this report may be automatically incorporated into an Adobe PDF or HTML5 page by the processor 42', for example. Moreover, this approach may allow an analyst to quickly follow threads without being overwhelmed, and it is valid for graphs as well. By way of example, a static graph and/or table may be encoded into a PDF, and a dynamic graph may be represented as an HTML5 page (or other suitable format). One such table 100 is provided in FIG. 11, in which vessels 31' are listed by respective entry numbers (here 1-15), geospatial positions, ship length, fractal dimensions, and respective classes. In this example, class 1 is handymax, class 2 is at the pier, class 3 is auxiliary, and class 4 is handysize.

In some embodiments, the processor 42' may further group the vessels 31' by their respective classifications, so that it may be readily determined how may of a given type of ship is present in a given area at the same time, or more generally how many ships of any type are present in the given area. As seen in the graph 75 of FIG. 8 which plots ship fractal dimensions vs. ship length in meters corresponding to the table 100, it will be seen that there are four vessels 31' present in an auxiliary class cluster 76, two vessels present in a handysize class cluster 77, five vessels present in a handymax class cluster 78, and four vessels present at a pier (represented by a cluster 79).

In addition to determining the dimensions (length, width, and/or height) of the vessels 31', the processor 42' may also use the fractal data to discern other useful information about the vessel. For example, the fractal heat map will also reflect an exhaust profile of the marine vessels, in that the amount of exhaust seen from the smoke stack(s) of a vessel will change depending on how hard the engines are working (e.g., due to high seas, increased speed, engine problems, etc.). As such, time lapse imagery may thereby be used to detect changes in the exhaust profile of a given vessel, so that appropriate alerts and/or corrections may be initiated when necessary.

The processor 42' may also advantageously determine a wake profile associated with respective vessels from the aerial marine imagery based upon the fractal algorithm. More particularly, when a vessel 31' is fully loaded it will throw a larger wake than when the vessel is carrying a partial load or is empty. Thus, change in the wake profile of a vessel 31' between subsequent image captures, and particularly where the image captures occur before and after a rendezvous event, is an indicator that cargo may have been removed or added to a vessel, as the case may be. Thus, reviewing the wake profiles of two vessels 31' after a rendezvous where one of the wake profiles goes from higher to lower, and the other profile goes from lower to higher, is an even stronger indication that a cargo transfer has taken place. The wake profile may be determined based upon the fractal dimensions immediately surrounding the vessel, which may be detected as a "V" pattern emanating from the bow of the vessel, as will be appreciated by those skilled in the art, with its height determined from the fractal analysis. Moreover, the respective heights of vessels 31' before and after a rendezvous as determined by a fractal analysis may also be a further indicator of a cargo transfer.

In accordance with another advantageous aspect, the processor 42' may be further configured to determine a vessel shape profile for the vessels 31'. More particularly, marine vessels are generally classified by their respective shapes and sizes. Example cargo ship classifications include Aframax, Capesize, Chinamax, Handymax/Supramax, Handysize, Malaccamax, Panamax and New Panamax, Q-max, Seawaymax, Suezmax, very large crude carriers (VLCCs) and ultra large crude carriers (ULCCs), each of which has respective limits on its maximum length, width, and/or draft which are set by different port or passageway authorities. Thus, based upon the shape/dimensions of a given vessel 31' determined by the fractal analysis, the processor 42' may match the given vessel to a respective ship classification (Handymax, Seawaymax, etc.). This may then be compared to the ship designation associated with the AIS data received for the vessel in question to confirm the imagery and AIS data are in agreement.

In accordance with another example, the processor 42' may be further configured to determine whether an actual course for a given marine vessel 31' deviates from a reported course from collected AIS data. More particularly, a given vessel 31' may be located in successive aerial images, and its identity may be confirmed via a comparison of its size, wake profile, exhaust profile, etc., obtained through the above-described fractal analysis by the processor 42'. As such, the actual course of a given vessel 31' as determined via the imagery may be compared with the course reported in the vessel's AIS data to determine if there is a discrepancy between them.

In still another example, the processor 42' may be configured to determine gaps in a reported course or heading for the marine vessels 31' based upon the AIS data. For example, a ship may stop transmitting AIS data at a given location to slip away unnoticed to another location. In such instances, location and tracking of the vessel 31' through the aerial imagery may be used to determine whether the vessel has actually gone and/or its true course. Similarly, the actual destination of a vessel 31' may be determined, either in contrast to reported AIS data or in the absence of any reported AIS data, by the processor 42'.

The processor 42' may optionally coordinate with sources such as the ship information and owner data databases 82, 83 described above to provide numerous types of useful information to operators, such as: the number and type of vessels operating around a given location; initiating electro-optic (E/O) coverage of the watch area using commercial assets; correlating AIS reports with E/O imagery for during similar collection windows; conducting link analysis on vessels, owners, parent companies and state entities; generating daily reports identifying ships (new, recurring, departed); imagery with identified targets; and most current link analysis. This may be done as automated surveillance with periodic reporting.

Figure 12:
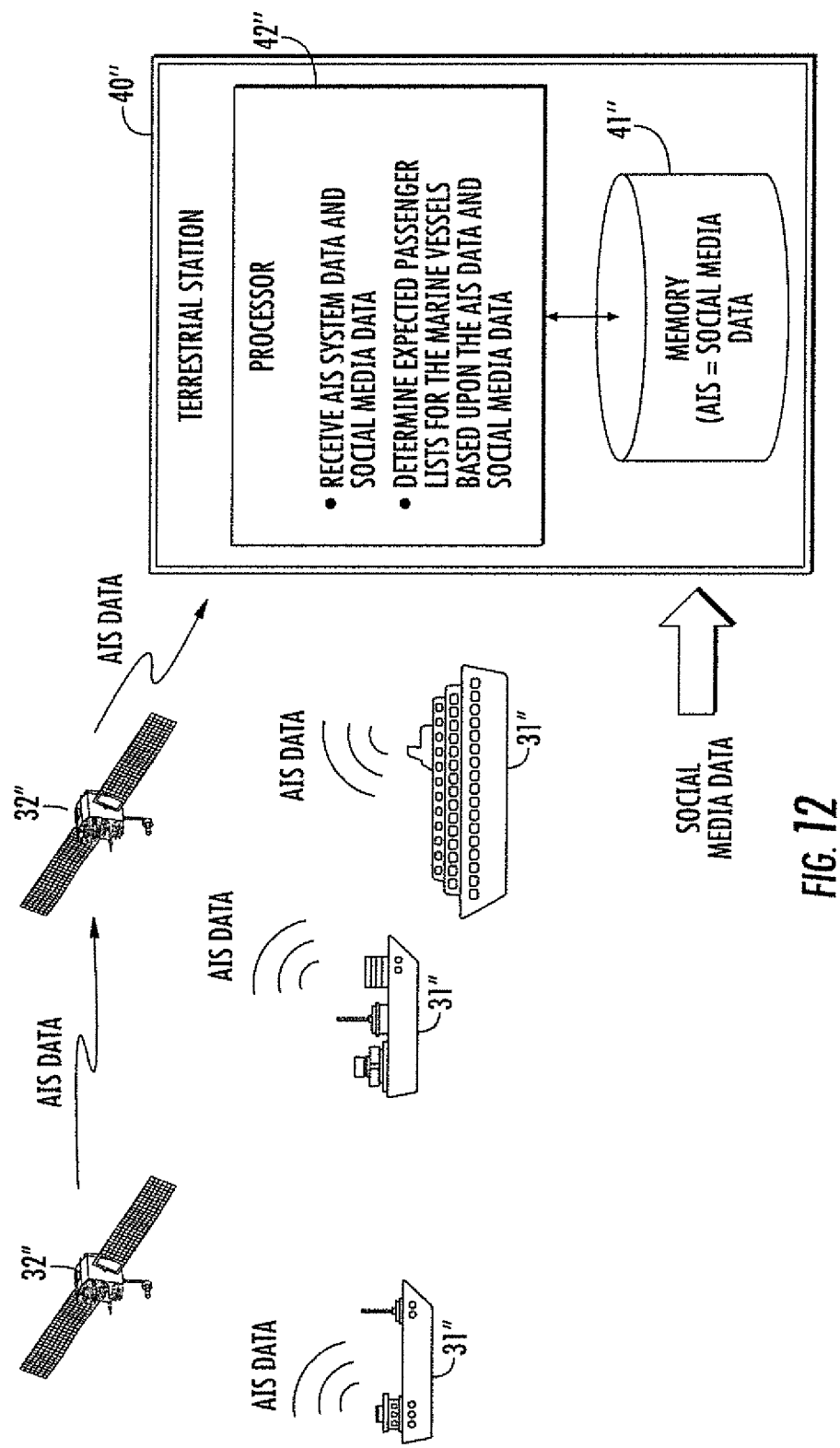
FIG. 12 is a schematic block diagram of a marine vessel monitoring system in accordance with another example embodiment which provides enhanced passenger detection features based upon open source social media data.
Figure 13:
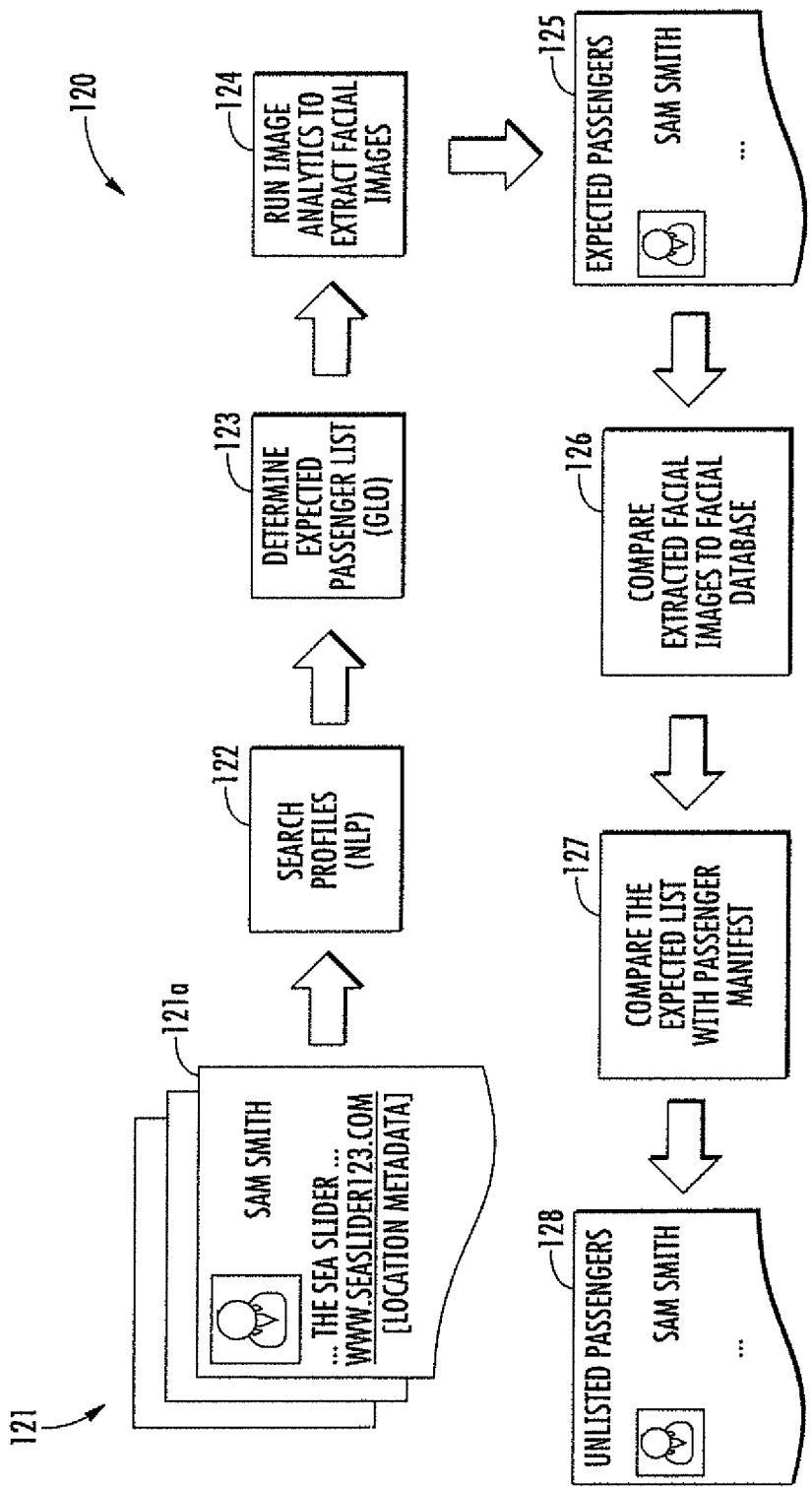
FIG. 13 is a flow diagram illustrating method aspects associated with the system of FIG. 12.
Figure 14:
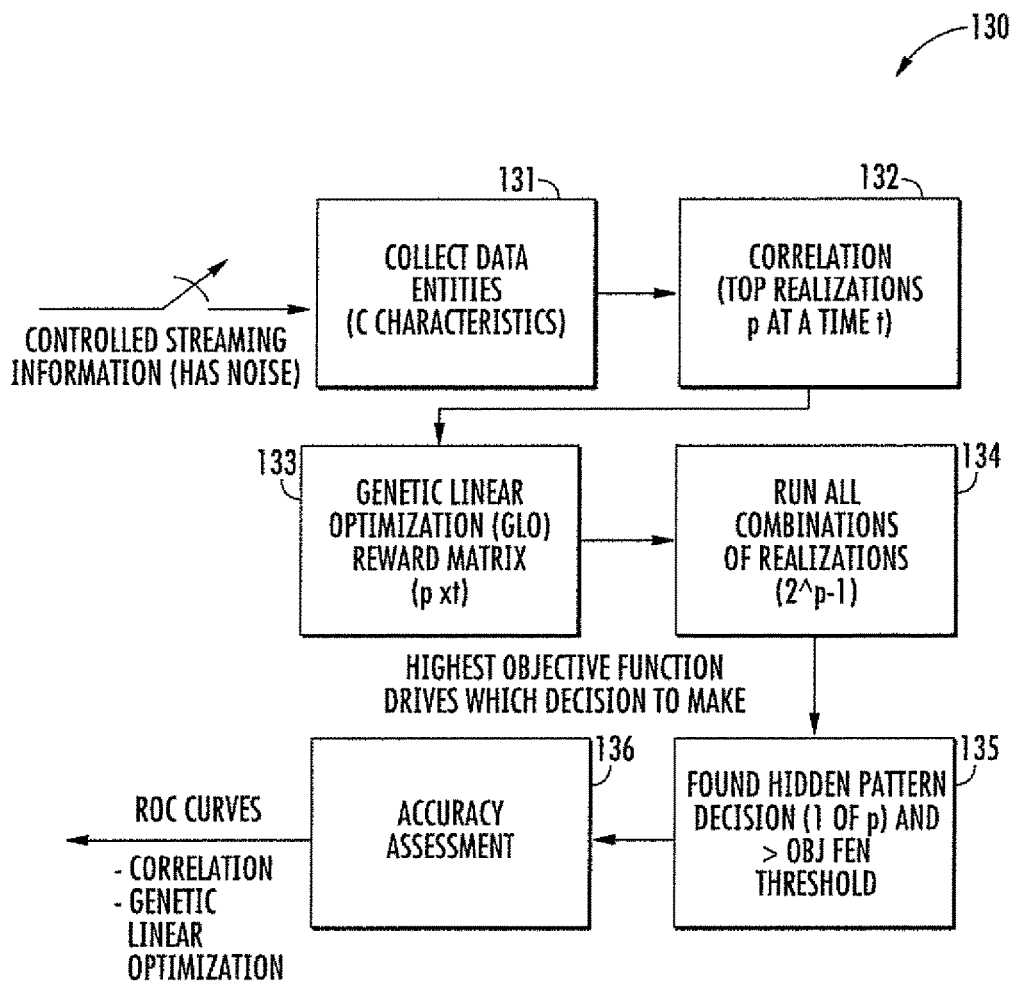
FIG. 14 is another flow diagram illustrating social media data processing steps which may be used by the system of FIG. 12 in accordance with an example embodiment.

Referring additionally to FIGS. 12-14, in accordance with another example implementation, the processor 42" of the terrestrial station 40" may advantageously receive, in addition to the AIS system data described above, social media data, such as open source social media profiles from sources such as Twitter, Facebook, Snapchat, etc. The processor 42" may use the social media data along with the AIS data as part of a quality analysis (Block 407 of FIG. 6) to determine expected passenger lists for marine vessels 42", which may include reported as well as unreported passengers in some instances. It should be noted that this approach does not require the aerial image processing and comparisons described above, but the terrestrial station 40" may also perform one or more of the vessel monitoring operations described above in addition to monitoring based upon social media data.

More particularly, the social media profiles may include useful metadata, including the location where profile updates were made, for example. In the case of Twitter profiles, they may include the following metadata: Twitter user name (linked to Google search); Twitter screen name (linked to Twitter page); location (linked to Google Maps); number of followers; number of friends; number of total tweets; time of latest tweet; source of tweet (mobile/desktop); and URLs (linked). Such information may not only be used to tie target vessels to Twitter followers, but also to tie target vessels to potentially malicious actors.

In the flow diagram 120 of FIG. 13, a plurality of social medial profiles 121 (e.g., Twitter, Facebook, Snapchat, etc.) are shown, including a fictitious profile 121a for a user Sam Smith. This profile 121a references a vessel named the "Sea Slider" and has a URL for a web page associated with this vessel ("www.seaslider123.com"). The processor 42" may advantageously search the social media profiles 121 using a technique such as Natural Language Processing (NLP) to identify verbs (activity), names, locations, and organizations in the data/metadata, at Block 122, although other techniques may also be used. A blacklist may be used to filter out common and undesired verbs in some embodiments. Furthermore, a sanitation process may also be performed by the processor 42" to clean undesired strings like HTML formatting and special characters to help expedite processing as well.

Generally speaking, NLP may provide better results for the social media data search compared to a simple matching of a word list, as it identifies parts of speech and entities from the grammatical context. An example of a benefit of this is that it can automatically identify some misspelled or slang words as verbs (e.g., "canceled", "respct", "forcast", "4got", etc.). However, simple matching or other search techniques may also be used in different embodiments.

The search results may then be processed to determine an expected passenger list (Block 123), that is, a list of people who are believed to be on a respective vessel 31" based upon an association found with the given vessel in the profile 121 and/or the location metadata associated with the profile. By way of example, the processor 42" may use a genetic linear optimization (GLO) model approach and correlation to determine from the search results which candidates are likely to be on a given vessel 31".

One example GLO model/correlation approach is shown in the flow diagram 130 of FIG. 14. Controlled streaming information (with noise) is provided as an input, from which data entities for a given number of characteristics (here correlations) are collected, at Block 131. A correlation of the top realizations at a given time t is performed, at Block 132, followed by a GLO operation which calculates the objective function from the correlations to populate a reward matrix (here a p×t matrix for p realizations at a time t), at Block 133. An example reward matrix is set forth in the following table:

|  | Metric 1 | Metric 2 | Metric 3 | Metric 4 | Metric 5 |
| --- | --- | --- | --- | --- | --- |
| Realization 1 | a11 | a12 | a13 | a14 | a15 |
| Realization 2 | b21 | b22 | b23 | b24 | b25 |
| Realization 3 | c31 | c32 | c33 | c34 | c35 |
| Realization 4 | d41 | d42 | d43 | d44 | d45 |
| Realization 5 | e51 | e52 | e53 | e54 | e55 |

Where $$v - a_{11}x1 - b_{21}x2 - c_{31}x3 - d_{41}x4 - e_{51}x5 - f_{61}x6 \leq 0$$

$$v - a_{12}x1 - b_{22}x2 - c_{32}x3 - d_{42}x4 - e_{52}x5 - f_{62}x6 \leq 0$$

$$v - a_{13}x1 b_{23}x2 - c_{33}x3 d_{43}x4 e_{53}x5 f_{63}x6 \leq 0$$

$$v - a_{14}x1 - b_{24}x2 - c_{34}x3 - d_{44}x4 - e_{54}x5 - f_{64}x6 \leq 0$$

$$v - a_{15}x1 - b_{25}x2 - c_{35}x3 - d_{45}x4 - e_{55}x5 f_{65}x6 \leq 0$$

and $$x1 + x2 + x3 + x4 + x5 + x6 = 1$$

$$x1, x2, x3, x4, x5, x6 \geq 0$$

The initial solution for desired mixed strategy in terms of probabilities is:

$$x = (x1, x2, x3, x4, x5, x6).$$

The linear program parameters may include a vector of topics discovered by topic modeling using Latent Dirichlet Allocation (LDA), for example, and a minimum or maximum solution approach may be used.

The highest objective function drives which decision to make, and the linear programming may then be run for all of the desired combinations, at Block 134. Once the "best" decision is determined via a hidden pattern decision based upon an objective function threshold, at Block 135, an accuracy assessment may be performed, at Block 136. If the desired accuracy is achieved, then the linear programming is completed and receiver operating characteristic (ROC) curves may be generated, if desired. In some embodiments, the answer characteristics may be changed and the above-noted steps repeated so that the global error minimum may be located, if desired.

Once the GLO/correlation results are determined, the processor 42" may optionally run image analytics to extract photos of the likely passengers, at Block 124. By way of example, the processor 42" may cross-link the social media profiles to publicly available photos, such as on flickr or Google Images, for example. The processor 42" may run the image analytics to extract target photos for an expected passenger list 125. In some embodiments, the extracted target photos may be further compared to a facial database by the processor 42", such as a criminal photo database or other "black list" photo library of potential bad actors, to output any matches therebetween. Moreover, the processor may optionally compare the list of expected passengers 125 to a passenger manifest for the given vessel 31", at Block 127, to generate a list of unlisted passengers aboard the vessel. That is, the processor 42" may compare the passenger manifest with the expected passenger list 125, and those that are present on the expected passenger list and not the ship manifest may be presented in a separate unlisted passenger list 128 to help authorities, ship owners, etc., determine when unauthorized passengers are aboard a vessel 31", for example. Furthermore, the list data may be saved in a database to provide for presentation views that may be filtered based on spatial and feature data attribution.

In some implementations, models may be created, trained, and updated to improve the NLP results. A model for each social media data type (Twitter, Facebook, etc.) may also be implemented to provide better results for each type, if desired. Generally speaking, objects may have periodic observations over time (actual or virtual), and observations may be fused periodically to develop time series and location relevance measures. A hypothesis may be established for what constitutes acceptable behavior, and the result of testing this hypothesis will update a judgment for the network.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed is:

1. A system for monitoring a plurality of marine vessels using a satellite network, the system comprising:
   a plurality of satellite payloads to be carried by respective satellites and configured to communicate via the satellite network, each satellite payload comprising:
      a radio frequency (RF) transceiver configured to communicate with the plurality of marine vessels, and
      a controller cooperating with the communications interface and the RF transceiver to:
         obtain automatic identification system (AIS) data including vessel position and call sign information via the RF transceiver, and
         communicate the AIS system data via the satellite network; and
   a terrestrial station configured to:
      receive aerial marine imagery data from at least one aerial marine imagery source,
      detect one or more abnormalities in the AIS data indicative of at least one potential rendezvous between a subset of the plurality of the marine vessels which pass within a threshold distance of each other for greater than a threshold time,
      in response to the one or more detected abnormalities in the AIS data, analyze at least some of the aerial marine imagery data to confirm that the at least one potential rendezvous comprises at least one actual rendezvous, and
      output a report to one or more of authorities, ship owners, cargo owners, and/or intelligence enterprises based upon confirming the at least one actual rendezvous.

2. The system of claim 1, wherein the terrestrial station comprises a processor and a memory coupled thereto configured to send at least one alert based upon the report.

3. The system of claim 1, wherein the terrestrial station comprises a processor and a memory cooperating therewith to combine the aerial marine imagery and the AIS data.

4. The system of claim 1, wherein the terrestrial station is further configured to determine whether an actual course for a given marine vessel deviates from a reported course based upon the AIS data and the aerial marine imagery.

5. The system of claim 1, wherein the terrestrial station is configured to detect at least one of the one or more abnormalities in the AIS data by determining a gap in at least one of reported vessel course data and vessel heading data based upon the AIS data.

6. The system of claim 1, wherein the RF transceiver comprises a Very High Frequency (VHF) transceiver.

7. A terrestrial station comprising:
a processor and a memory cooperating therewith to:
receive aerial marine imagery from at least one aerial marine imagery source;
receive respective automatic identification system (AIS) data including vessel position and call sign information for a plurality of marine vessels from a plurality of satellites receiving the AIS data from the plurality of marine vessels;
detect one or more abnormalities in the AIS data indicative of at least one potential rendezvous between a subset of the plurality of the marine vessels which pass within a threshold distance of each other for greater than a threshold time;
in response to the one or more detected abnormalities in the AIS data, analyze at least some of the aerial marine imagery to confirm that the at least one potential rendezvous comprises at least one actual rendezvous; and
output a report to one or more of authorities, ship owners, cargo owners, and/or intelligence enterprises based upon confirming the at least one actual rendezvous.

8. The terrestrial station of claim 7, wherein the processor is further configured to send at least one alert based upon the report.

9. The terrestrial station of claim 7, wherein the processor is configured to combine the aerial marine imagery and the AIS data.

10. The terrestrial station of claim 7, wherein the processor is further configured to determine whether an actual course for a given marine vessel deviates from a reported course based upon the AIS data and the aerial marine imagery.

11. The terrestrial station of claim 7, wherein the processor is further configured to detect at least one of the one or more abnormalities in the AIS data by determining a gap in at least one of reported vessel course data and vessel heading data based upon the AIS data.

12. A marine vessel monitoring method comprising:
receiving aerial marine imagery data from at least one aerial marine imagery source at a terrestrial station;
receiving, at the terrestrial station, respective automatic identification system (AIS) data including vessel position and call sign information for a plurality of marine vessels from a plurality of satellites receiving the AIS data from the plurality of marine vessels;
detecting, at the terrestrial station, one or more abnormalities in the AIS data indicative of at least one potential rendezvous between a subset of the plurality of the marine vessels which pass within a threshold distance of each other for greater than a threshold time;
analyzing at least some of the aerial marine imagery data, at the terrestrial station and in response to the one or more detected abnormalities in the AIS data, to confirm that the at least one potential rendezvous comprises at least one actual rendezvous; and
outputting a report to one or more of authorities, ship owners, cargo owners, and/or intelligence enterprises based upon confirming the at least one actual rendezvous.

13. The method of claim 12, further comprising sending at least one alert from the terrestrial station based upon the report.

14. The method of claim 12, further comprising combining the aerial marine imagery and the AIS data.

15. The method of claim 12, further comprising, at the terrestrial station, determining whether an actual course for a given marine vessel deviates from a reported course based upon the AIS data and the aerial marine imagery.

16. The method of claim 12, wherein detecting at least one of the one or more abnormalities in the AIS data comprises determining a gap in at least one of reported vessel course data and vessel heading data based upon the AIS data.

* * * * *